United States Patent
Sulaiman et al.

(10) Patent No.: US 11,148,559 B2
(45) Date of Patent: Oct. 19, 2021

(54) ADJUSTMENT ARRANGEMENT FOR AN ADJUSTING DEVICE OF A VEHICLE SEAT AND A METHOD FOR PRODUCING THE SAME

(71) Applicant: FAURECIA AUTOSITZE GMBH, Stadthagen (DE)

(72) Inventors: Hosen Sulaiman, Dortmund (DE); Jörg Völlmecke, Porta Westfalica (DE); Markus Schenke, Petershagen (DE); Michael Schaper, Petershagen (DE); Jens Witt, Nienstädt (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 682 days.

(21) Appl. No.: 15/947,950

(22) Filed: Apr. 9, 2018

(65) Prior Publication Data

US 2018/0297492 A1 Oct. 18, 2018

(30) Foreign Application Priority Data

Apr. 18, 2017 (DE) .................... 10 2017 108 206.9

(51) Int. Cl.
  *B21D 39/06* (2006.01)
  *B60N 2/20* (2006.01)
  *B60N 2/68* (2006.01)
  *B60N 2/02* (2006.01)
  *B60N 2/16* (2006.01)

(52) U.S. Cl.
  CPC ............. *B60N 2/167* (2013.01); *B21D 39/06* (2013.01); *B60N 2/02* (2013.01); *B60N 2/165* (2013.01); *B60N 2/20* (2013.01); *B60N 2/682* (2013.01)

(58) Field of Classification Search
  CPC ........ F16B 9/07; F16B 17/006; Y10T 403/49; Y10T 403/4933; Y10T 403/4941; Y10T 403/4949; Y10T 403/4966; B60N 2/165; B60N 2/167
  See application file for complete search history.

(56) References Cited

U.S. PATENT DOCUMENTS 1,027,835 A * 5/1912 Gale ..................... F16H 55/44
  474/97
3,024,300 A * 3/1962 Martin ..................... H01J 5/26
  174/50.61

(Continued)

FOREIGN PATENT DOCUMENTS

DE       4341206 A1 *  6/1995  ........... B62D 27/065
DE   102005007716 A1     8/2006
(Continued)

OTHER PUBLICATIONS

German Office Action for German App. No. DE 2017 108206.9 (with translation) (Year: 2017).*

(Continued)

*Primary Examiner* — Amber R Anderson
*Assistant Examiner* — Alexus Camero
(74) *Attorney, Agent, or Firm* — Barnes & Thornburg LLP

(57) ABSTRACT

An adjustment arrangement for an adjustment device of a vehicle seat comprises a transverse tube and at least one connecting part connected fixedly in terms of rotation to the transverse tube. The transverse tube is inserted into a bore in the connecting part.

19 Claims, 2 Drawing Sheets

(56) References Cited

U.S. PATENT DOCUMENTS

| | | | | |
|---|---|---|---|---|
| 4,233,726 | A | * | 11/1980 | Williams ............... B21D 39/06 248/220.21 |
| 4,597,687 | A | * | 7/1986 | Colas ...................... E06C 7/085 403/242 |
| 4,913,268 | A | * | 4/1990 | Parker .................... B60R 19/32 188/322.19 |
| 6,435,613 | B1 | * | 8/2002 | Kupietz ............... B60N 2/1615 297/338 |
| 2010/0219319 | A1 | | 9/2010 | Ducreuzot |
| 2015/0336477 | A1 | * | 11/2015 | Matsui ..................... B60N 2/06 297/344.15 |
| 2018/0051834 | A1 | | 2/2018 | Hofmann |

FOREIGN PATENT DOCUMENTS

| | | | |
|---|---|---|---|
| DE | 102013009847 A | | 12/2013 |
| DE | 102015103228 A1 | | 9/2016 |
| DE | 102015206461 A1 | | 10/2016 |
| DE | 102015219497 A1 | * | 4/2017 ............. B60N 2/682 |
| DE | 102015219497 A1 | | 4/2017 |
| EP | 143062 A | | 5/1985 |
| EP | 0749867 A1 | * | 12/1996 ............. B60N 2/688 |
| EP | 1609561 A2 | * | 12/2005 ............ B23P 19/062 |
| EP | 2027951 A1 | | 2/2009 |
| JP | S60104885 A | | 6/1985 |

OTHER PUBLICATIONS

Japanese Office Action for Japanese App. No 2018-078809 dated Apr. 10, 2019, 601-682 JP, 1 page, English translation only.
First Chinese Office Action for Chinese App. No. 201810347915.8 dated Mar. 5, 2018, 2 pages.
Second Chinese Office Action for Chinese App. No. 201810347915.8 dated Aug. 1, 2019, 1 page.

\* cited by examiner

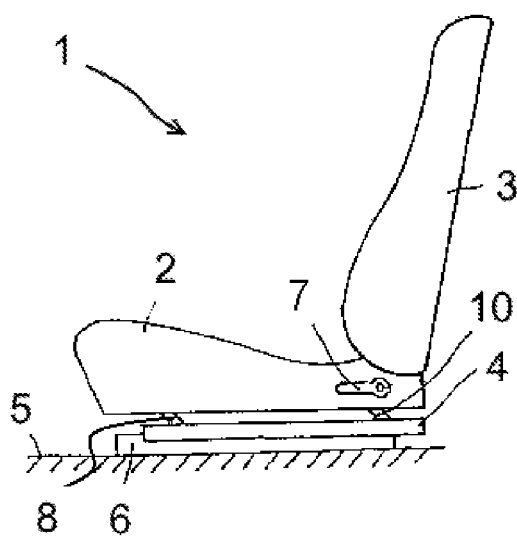
Fig. 1
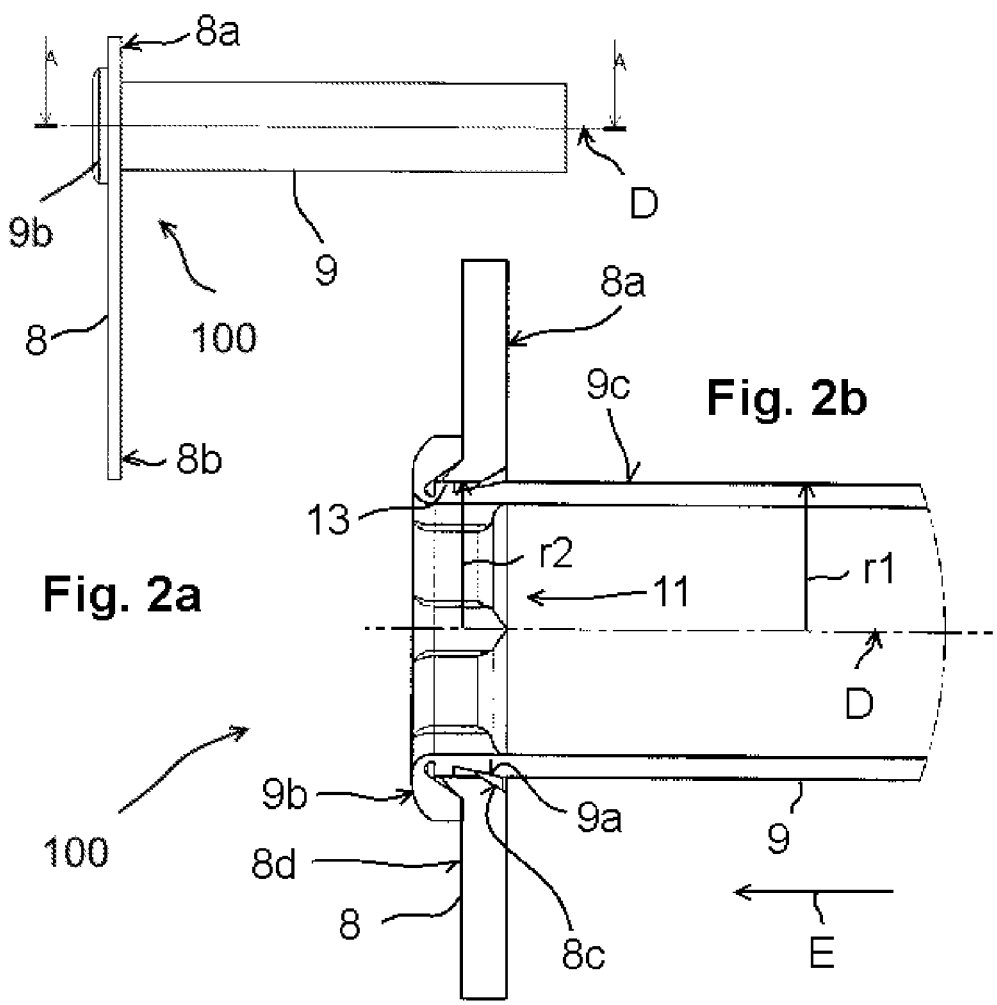
Fig. 2a
Fig. 2b

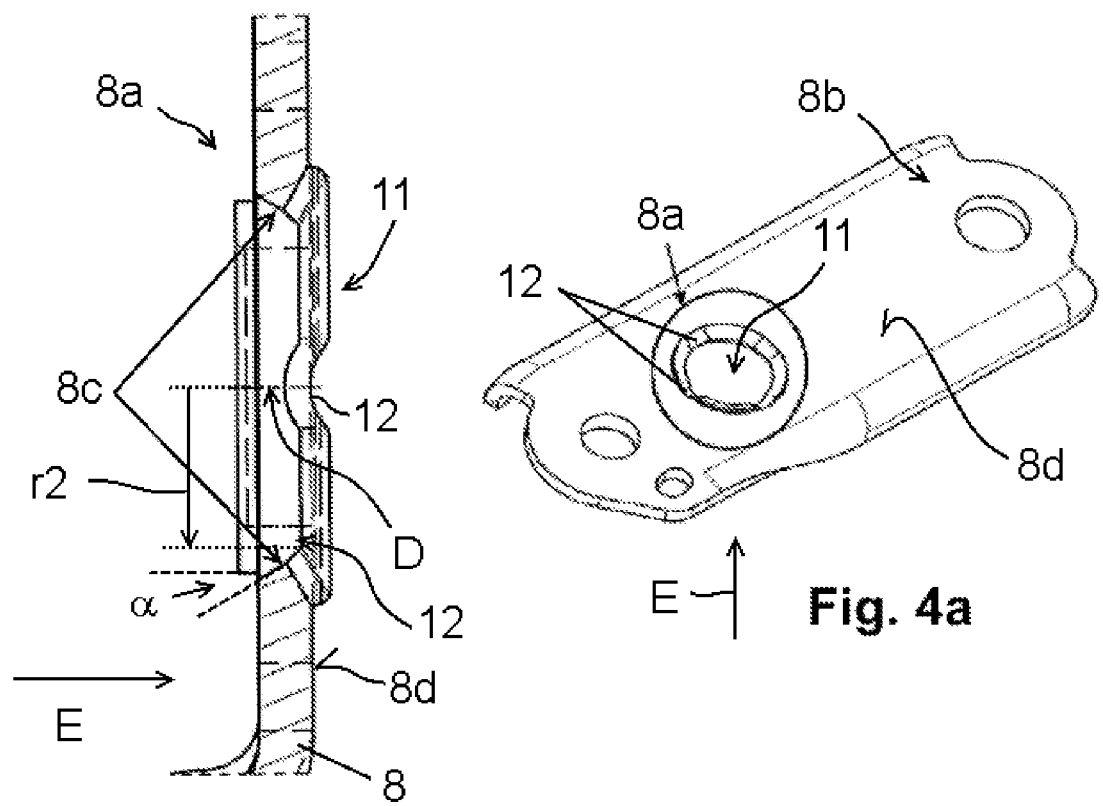
Fig. 3
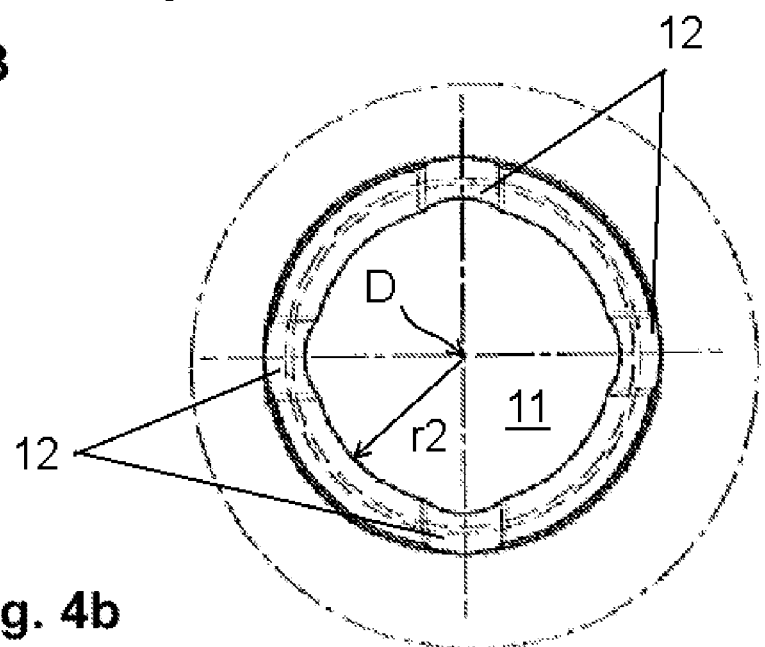
Fig. 4a
Fig. 4b

ADJUSTMENT ARRANGEMENT FOR AN ADJUSTING DEVICE OF A VEHICLE SEAT AND A METHOD FOR PRODUCING THE SAME

PRIORITY CLAIM

This application claims priority to German Patent Application No. DE 10 2017 108 206.9, filed Apr. 18, 2017, which is expressly incorporated by reference herein.

BACKGROUND

The present disclosure relates to an occupant support, and particularly to a vehicle seat. More particularly, the present disclosure relates to an adjustment arrangement for an adjustment device of a vehicle seat.

SUMMARY

According to the present disclosure, an adjustment arrangement for an adjustment device of a vehicle seat comprises a transverse tube and at least one connecting part connected fixedly in terms of rotation to the transverse tube. The transverse tube is inserted into a bore in the connecting part.

In illustrative embodiments, a connecting part-bearing surface, which is chamfered by a specific angle, is provided on a connecting part of an adjustment arrangement in the region of the bore. An opposing chamfered transverse tube-bearing surface of the transverse tube is configured to bear against said connecting part-bearing surface to block axial movement of the transverse tube in the bore. An end region of the transverse tube is radially outwardly shaped such that the connecting part is clamped between the transverse tube-bearing surface and the outwardly shaped end region. In this way, the transverse tube is connected fixedly in terms of rotation to the connecting part.

In illustrative embodiments, at least one indentation is arranged on the connecting part in the region of the bore. A convex portion opposing each indentation is provided on the transverse tube such that a rotation between the transverse tube and the connecting part is blocked. The convex portion on the transverse tube is located in the indentation in the region of the bore to block rotation of the transverse tube in the bore relative to the connecting part.

In illustrative embodiments, the convex portions on the transverse tube are configured to be formed by at least partial deformation of a surface of the transverse tube in the region of the convex portions and/or by at least partial deformation of a surface of the transverse tube in the region adjacent to the convex portions. The convex portions are configured to be formed during a connecting process in which the transverse tube is inserted into the bore on the connecting part.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 shows a schematic view of a vehicle seat, in accordance with the present disclosure;

FIG. 2a shows a side elevation view of the connection between a front transverse tube and a front control arm;

FIG. 2b shows an enlarged elevation view of a portion of the front transverse tube and the front control arm;

FIG. 3 shows a sectional view of the front control arm in the region of a bore;

FIG. 4a shows a perspective view of the front control arm; and

FIG. 4b shows a sectional view of the bore.

DETAILED DESCRIPTION

According to FIG. 1, a vehicle seat 1 including a seat part 2 and a backrest 3 is shown. The vehicle seat 1 is mounted via upper rails 4 in a longitudinally adjustable manner on the vehicle floor 5. The upper rails 4 are displaceably received in lower rails 6. Moreover, according to this exemplary embodiment, the vehicle seat 1 is provided with a height adjustment device. For the height adjustment of the motor vehicle seat 1 a height adjustment pump (not shown) is provided on a seat side, said height adjustment pump being actuated via an operating lever 7. The height adjustment pump has a pinion that meshes with a toothed segment on a rear control arm 10 which here serves as a connecting part. An upper end of the rear control arm 10 is connected fixedly in terms of rotation to a rear transverse tube (not shown). An additional rear control arm 10 is received fixedly in terms of rotation in an identical manner at the other end of the rear transverse tube.

By a corresponding pumping action using the operating lever 7 the pinion of the height adjustment pump acts on the toothed segment of the one rear control arm 10 so that this rear control arm 10 pivots in either direction by rotating the rear transverse tube. This pivoting movement is transmitted via the rear transverse tube to the other rear control arm 10. A pivoting movement caused by the height adjustment pump thus acts at the same time on both rear control arms 10, whereby the height of the seat part 2 may be adjusted relative to the vehicle floor 5.

In addition, according to FIG. 1, two front control arms 8 are provided as connecting parts which in a corresponding manner are connected together fixedly in terms of rotation by a front transverse tube 9 and, by bearing against the upper rails 4 and the seat part frame of the seat part 2, also pivot with an actuation of the operating lever 7, so that the vehicle seat 1 as a whole is adjusted upwardly or downwardly. A detailed view thereof is shown, in particular, in FIGS. 2a and 2b, which show the front control arm 8 with the front transverse tube 9. Via the front transverse tube 9, the upper ends 8a of the front control arms 8 are mounted pivotably about a rotational axis D on a seat part frame of the seat part 2. Via a lower end 8b of the front control arms 8, the control arms 8 are also in each case pivotably mounted on the upper rail 4.

In order to form a connection, which is fixed in terms of rotation, between the front transverse tube 9 and the two front control arms 8 and thereby to provide an adjustment arrangement 100 which is part of the respective adjustment device, the front transverse tube 9 has an external radius r1 and is inserted through a bore 11 in the upper end 8a of the front control arm 8. Said bore 11 has an internal radius r2 and the external radius r1 is larger than the internal radius r2. By way of example, this is described in more detail hereinafter relative to one of the front control arms 8.

Axial movement of the front transverse tube 9 relative to the front control arm 8 along the rotational axis D is accordingly limited by the front transverse tube 9 in the region of the bore 11 with a chamfered transverse tube-bearing surface 9a at least partially bearing against a connecting part-bearing surface 8c on the front control arm 8 and being supported thereon. As a result, the axial movement of the front transverse tube 9 is limited in a direction of insertion E since the connecting part-bearing surface 8c blocks further insertion in the direction of insertion E at least without exerting a high force.

Moreover, in order to prevent axial movement of the front transverse tube 9 opposite the direction of insertion E, the front transverse tube 9 in an end region 9b is bent back radially outwardly over the periphery onto a control arm-rear face 8d (connecting part-rear face). Thus the front transverse tube 9 is retained by the cooperation of the chamfered bearing surfaces 9a, 8c and the bent-back end region 9b of the front transverse tube 9 on the front control arm 8 and/or the front control arm 8 is thereby clamped by the transverse tube 9. Due to the at least partial peripheral bearing of the two bearing surfaces 9a, 8c, a radial movement is also prevented perpendicular to the rotational axis D.

The torsional strength of the front transverse tube 9 relative to the front control arm 8 may be formed by the above-described clamping. In order to assist this, as shown in FIGS. 3, 4a and 4b, four indentations 12, which are incorporated in the region of the bore 11 and which are arranged offset to one another by 90°, are also provided. The front transverse tube 9 with convex portions 13, as shown in a FIG. 2b, are located in these indentations 12. The convex portions 13 in the front transverse tube 9 are configured to connect the front transverse tube 9 to the front control arm 8. The front transverse tube 9 bears in the region of the bore 11, over the entire periphery, against the front control arm 8, by the transverse tube-bearing surface 9a bearing flat against the connecting part-bearing surface 8c and offset therebetween by 90° the four convex portions 13 on the front transverse tube 9 bear against the four indentations 12 of the bore 11. As a result, the front transverse tube 9 is blocked from rotating relative to the front control arm 8. Thus, movement of the front transverse tube 9 relative to the front control arm 8 may be blocked or limited in all directions.

In a connecting process for forming the connection between the front transverse tube 9 and the respective front control arm 8 such as, for example, for forming the adjustment arrangement 100, the following steps may be provided:

In a first step St1 a cylindrical front transverse tube 9 is pro-vided with an external radius r1 and with a shapeable end region 9b and the front control arm 8 is provided with a bore 11, which has an internal radius r2 which is smaller than the external radius r1 of the front transverse tube 9, and with an at least partially peripheral chamfered connecting part-bearing surface 8c as well as indentations 12—as shown by way of example in FIG. 3. The connecting part-bearing surface 8c is, for example, chamfered by an angle α of between 50° and 70°, in particular ca. 60° relative to the horizontal.

In a second step St2, the front transverse tube 9 is inserted into the bore 11 of the front control arm 8 until the end region 9b protrudes through the bore 11. This takes place due to the differences in the radii r1, r2, by the action of force and deformation of the front transverse tube 9 at least in the region of a surface 9c of the front transverse tube 9 in which the surface 9c abuts against the bore 11, so that the surface 9c of the front transverse tube 9 is at least partially adapted to the profile of the bore 11.

Accordingly, the chamfered transverse tube-bearing surfaces 9a are formed on the surface 9c of the front transverse tube 9, said chamfered transverse tube-bearing surfaces being formed so as to be opposing chamfered relative to the connecting part-bearing surfaces 8c which are chamfered by the angle α. In the region of the indentations 12 in the bore 11, the surface 9c of the front transverse tube 9 is deformed to a lesser degree since the internal radius r2 of the bore 11 in the region of the indentations 12 deviates less from the external radius r1 of the front transverse tube 9. Potentially the surface 9c of the front transverse tube 9 in this region may also remain unaffected, depending on the depth of the indentations 12. As a result, it is ensured that the front transverse tube 9 is not able to be rotated in the bore 11 and thus relative to the front control arm 8.

The insertion of the front transverse tube 9 is carried out, for example, until a certain expenditure of force is required in order to insert the front transverse tube 9 more deeply and thus to deform it further. Moreover, the insertion may be limited by a sufficiently large part of the front transverse tube 9 protruding through the bore 11, and thus the end region 9b of the front transverse tube 9 in a third step St 3 being able to be shaped radially outwardly such that this front transverse tube is able to bear against the control arm rear face 8d, so that the front control arm 8 is effectively clamped between the shaped end region 9b and the tube-connecting surface 9a.

Thus the connecting process is complete and the front transverse tube 9 is received fixedly in terms of rotation on the front control arm 8. This type of connection with a transverse tube may be provided for all control arms 8, 10 which are shown in FIG. 1, i.e. for example also for the rear control arms 8 and the rear transverse tube, not shown. In addition, in a tilt adjustment de-vice of the backrest 3 such a connection may also be provided between the transverse tube and a control arm or a fitting or a flange, which may take place in an identical manner, torsional strength and a secure hold also being able to be achieved thereby in this tilt adjustment device.

Adjustment devices for vehicle seats, for example tilt adjustment devices for a backrest or height adjustment devices for the entire vehicle seat may have transverse tubes which are mounted on frame structures and which may be connected fixedly in terms of rotation to connecting parts, for example control arms, flanges or fittings. A rotational movement or a pivoting movement may be transmitted to the transverse tube via the connecting parts and/or the transverse tube transmits a rotational movement to the connecting parts in order to be able to actuate indirectly or directly a specific adjusting mechanism via the connecting parts. In this case, for example, such a connecting part is arranged fixedly in terms of rotation on both sides of the transverse tube in order to be able to transmit a pivoting movement on both sides to the corresponding adjusting mechanism on the vehicle seat and/or on the respective vehicle seat component.

Some connecting parts may have very high deformation in the event of an impact on the vehicle and a permanent and reliable connection between the transverse tube and the connecting part may not be ensured. Moreover, the production of the connection between both components may be complex. It is, therefore, the object of this disclosure to provide an adjustment arrangement for an adjustment device of a vehicle seat which may be used safely and reliably even under load and which additionally may be configured with little effort and low costs. Additionally, it is the object of the disclosure to specify a method for producing such an adjustment arrangement.

Accordingly a connecting part-bearing surface, which is chamfered by a specific angle, is provided on a connecting part of an adjustment arrangement, for example a control arm or a flange, in the region of a bore, into which a transverse tube of the adjustment arrangement is inserted, an opposing chamfered transverse tube-bearing surface of the transverse tube bearing against said connecting part-bearing surface. As a result, an axial movement of the transverse tube in the bore is limited. Additionally, an end region of the transverse tube on a connecting part-rear face of the connecting part is radially outwardly shaped such that the connecting part is clamped between the transverse tube-bearing surface which bears against the connecting part-bearing surface and the outwardly shaped end region so that the transverse tube is connected fixedly in terms of rotation to the connecting part.

As a result, the connection between the transverse tube and the connecting part is not formed by a shaped bead. By the cooperation of the bearing surfaces, greater forces may be absorbed compared to a bead or a double fold so that a safe and reliable connection may be provided, even in the case of high loads. Additionally, material costs and mounting effort may be reduced, since, except for the deformation of the end region, no additional shaping process may be required.

According to illustrative embodiments, at least one indentation is arranged on the connecting part in the region of the bore. A convex portion opposing said indentation is provided on the transverse tube such that a rotation between the transverse tube and the connecting part is prevented. In other words, the convex portion on the transverse tube is located in the indentation in the region of the bore and thus blocks a rotation of the transverse tube in the bore relative to the connecting part. Torsional strength may be improved, since this feature assists the clamping action which is already able to ensure a certain level of torsional strength.

According to illustrative embodiments, four indentations are provided on the connecting part. Said indentations are arranged offset to one another by 90° in the region of the bore. As a result, torsional strength may be ensured even in the case of very high loads.

The convex portions on the transverse tube are able to be configured or formed by at least partial deformation of a surface of the transverse tube in the region of the convex portions and/or by at least partial deformation of a surface of the transverse tube in the region adjacent to the convex portions. As a result, the convex portions may be configured during a connecting process in which the transverse tube is inserted into the bore on the connecting part. Because an external radius of the transverse tube in the original state before insertion is larger than an internal radius of the bore, the surface of the transverse tube, when inserted, is adapted to the profile of the bore by the action of a force. Since the bore has an indentation, therefore, the surface of the transverse tube during the connecting process is deformed such that at least one convex portion is formed on the transverse profile, opposite the indentation. This either takes place by the external radius of the transverse tube being reduced in certain regions and thereby a convex portion remains therebetween or by the transverse tube also being deformed in the region of the convex portion itself.

As a result, no additional convex portions or similar elements have to be previously produced on the transverse tube, and thus an additional shaping may be dispensed with. As a result, production cost may be minimized, since only one transverse tube has to be provided, said transverse tube having a lower degree of hardness than the connecting part and/or the region of the bore on the connecting part, so that the transverse tube may be adapted to the profile of the bore without damaging the bore itself.

According to illustrative embodiments, similar to the convex portions on the transverse tube, the chamfered transverse tube-bearing surface is also able to be configured or formed by a deformation of the surface of the transverse tube. In other words, the transverse tube-bearing surface may even be configured during the connecting process, by a deformation of the surface of the transverse tube taking place through the connecting part-bearing surface, due to the different radii of the bore and the transverse tube. By the insertion of the transverse tube into the bore by the action of force, it is accordingly achieved that an opposing chamfered transverse tube-bearing surface is formed, so that the clamping action according to the present disclosure may be formed without great mounting effort and with only a few mounting steps and without previously shaping the transverse tube.

According to illustrative embodiments, the chamfered connecting part-bearing surface on the connecting part is chamfered by an angle of between 50° and 70°, in particular 60°. As a result, forces are transmitted from the transverse tube to the connecting part. At the same time, during the connecting process only a relatively small action of force is required for the deformation of the transverse tube and the transverse tube-bearing surface is formed thereby.

According to illustrative embodiments, it is further provided that the shaped end region bears against a connecting part-rear face of the connecting part for forming the clamping action, so that no additional elements which ensure the clamping action may be required.

The adjustment arrangement, illustratively, is part of an adjustment device for a vehicle seat, for example a height adjustment device of the vehicle seat or a tilt adjustment device of a backrest. The transverse tube of the adjustment arrangement, according to present disclosure, is the front transverse tube of a height adjustment device. The adjustment arrangement in this case allows a lifting and lowering of the seat part in the front region and accordingly the front control arms of the height adjustment device serve as connecting parts. The transverse tube may be correspondingly adapted but also the rear transverse tube of the height adjustment device may be adapted. Said rear transverse tube includes rear control arms as connecting parts, an actuation of an actuating device being transmitted thereby, for example, via a gear ring.

For producing such an adjustment arrangement, according to the present disclosure, a transverse tube with an external radius and with a shapeable end region and a connecting part with a bore is provided. The connecting part has an internal radius which is smaller than the external radius of the transverse tube, and with a connecting part-bearing surface which is chamfered by an angle.

Subsequently, the transverse tube is inserted in a direction of insertion into the bore in the connecting part by deforming the surface of the transverse tube such that, due to the difference in the radii on the surface of the transverse tube, a transverse tube-bearing surface which is chamfered opposite the connecting part-bearing surface is formed. The insertion is carried out at least until the end region protrudes from the bore on a connecting part-rear face.

Subsequently, a shaping of the end region of the transverse tube is provided such that the connecting part in the region of the bore is clamped between the transverse tube-bearing surface and the shaped end region, so that the transverse tube is connected fixedly in terms of rotation to the connecting part. Thus, a safe and reliable connection may be formed in a simple manner and the relevant shaping processes may be directly carried out during the connection without a transmission of force via a bead or a fold being present at the same time.

As the shaping takes place directly via the bore, in which the transverse tube is also fastened, rattling noises when setting the seat height or seat tilt may be avoided since the shaping may be carried out to the extent which is actually required. By the chamfered bearing surfaces, therefore, the suppression of undesired noise may be mitigated.

The invention claimed is:

1. An adjustment device of a vehicle seat for adjusting a vehicle seat component, comprising
    a transverse tube and at least one connecting part connected fixedly in terms of rotation to the transverse tube, wherein the transverse tube is arranged to lie in a bore in the connecting part,
    a connecting part-bearing surface chamfered by an angle and formed on the connecting part in the region of the bore, an opposing chamfered transverse tube-bearing surface of the transverse tube bearing against said connecting part-bearing surface for limiting an axial movement of the transverse tube, and
    an end region of the transverse tube on a connecting part-rear face of the connecting part being radially outwardly shaped such that the connecting part is clamped between the transverse tube-bearing surface which bears against the connecting part-bearing surface and the outwardly shaped end region,
    wherein at least one indentation is formed on the connecting part-bearing surface of the connecting part in the region of the bore and a convex portion is provided on the transverse tube opposing said at least one indentation such that a rotation between the transverse tube and the connecting part is blocked,
    wherein the convex portion on the transverse tube is configured to be formed by at least partial deformation of a surface of the transverse tube in the region of the convex portion,
    wherein the convex portion on the transverse tube is configured to be formed during a connecting process of the transverse tube and the connecting part, and the transverse tube has an external radius which is larger than an internal radius of the bore so that the surface of the transverse tube is deformed by an insertion of the transverse tube into the bore during the connecting process such that the convex portions are formed opposite the at least one indentation, and
    wherein the external radius of the transverse tube is constant between a connecting part front face opposite the connecting part-rear face and a point on said transverse tube spaced apart from the connecting part front face and the end region of the transverse tube.

2. The adjustment device of claim 1, wherein said at least one indentation comprises four indentations, said indentations being arranged offset to one another by 90° in the region of the bore.

3. The adjustment device of claim 1, wherein each convex portion on the transverse tube is configured to be formed by at least partial deformation of a surface of the transverse tube in the region adjacent to each convex portion.

4. The adjustment device of claim 1, wherein the transverse tube-bearing surface is configured to be formed by a deformation of a surface of the transverse tube.

5. The adjustment device of claim 4, wherein the surface of the transverse tube is deformed by an insertion of the transverse tube into the bore during the connecting process such that the transverse tube-bearing surface is formed opposite the connecting-bearing surface.

6. The adjustment device of claim 1, wherein the chamfered connecting part-bearing surface on the connecting part is chamfered by an angle between 50° and 70°.

7. The adjustment device of claim 1, wherein the chamfered connecting part-bearing surface on the connecting part is chamfered by an angle of about 60°.

8. The adjustment device of claim 1, wherein the shaped end region is configured to bear against a connecting part-rear face of the connecting part.

9. The adjustment device of claim 1, wherein the adjustment device includes a height adjustment device.

10. The adjustment device of claim 1, wherein the adjustment device includes a tilt adjustment device.

11. A method for producing an adjustment device, the method comprising the steps of
    providing a transverse tube with an external radius and with a shapeable end region and a connecting part with a bore, which has an internal radius which is smaller than the external radius of the transverse tube, and with a connecting part-bearing surface which is chamfered by an angle;
    inserting the transverse tube in a direction of insertion into the bore in the connecting part by deforming a surface of the transverse tube such that due to the difference in the radii on the surface of the transverse tube a transverse tube-bearing surface which is chamfered opposite the connecting part-bearing surface is formed, wherein the transverse tube is inserted into the bore at least until the end region protrudes from the bore on a connecting part-rear face; and
    shaping the end region of the transverse tube such that the connecting part is clamped between the transverse tube-bearing surface and the shaped end region, so that the transverse tube is connected fixedly in terms of rotation to the connecting part,
    wherein at least one indentation is formed on the connecting part-bearing surface of the connecting part in the region of the bore and a convex portion is provided on the transverse tube opposing said at least one indentation such that a rotation between the transverse tube and the connecting part is blocked,
    wherein the convex portion on the transverse tube is configured to be formed by at least partial deformation of a surface of the transverse tube in the region of the convex portion such that the convex portions are formed opposite the at least one indentation, and
    wherein the external radius of the transverse tube is constant between a connecting part front face opposite the connecting part-rear face and a point on said transverse tube spaced apart from the connecting part front face and the end region of the transverse tube.

12. An adjustment device of a vehicle seat for adjusting a vehicle seat component, comprising
    a transverse tube and at least one connecting part connected fixedly in terms of rotation to the transverse tube, wherein the transverse tube is arranged to lie in a bore in the connecting part,
    a connecting part-bearing surface chamfered by an angle and formed on the connecting part in the region of the bore, an opposing chamfered transverse tube-bearing surface of the transverse tube bearing against said connecting part-bearing surface for limiting an axial movement of the transverse tube, and
    an end region of the transverse tube on a connecting part-rear face of the connecting part being radially outwardly shaped such that the connecting part is clamped between the transverse tube-bearing surface which bears against the connecting part-bearing surface and the outwardly shaped end region, wherein at least one indentation is formed on the connecting part-bearing surface of the connecting part in the region of the bore and a convex portion is provided on the transverse tube opposing said at least one indentation such that a rotation between the transverse tube and the connecting part is blocked, wherein the convex portion on the transverse tube is configured to be formed by at least partial deformation of a surface of the transverse tube in the region of the convex portion, wherein the convex portion on the transverse tube is configured to be formed during a connecting process of the transverse tube and the connecting part, and the transverse tube has an external radius which is larger than an internal radius of the bore so that the surface of the transverse tube is deformed by an insertion of the transverse tube into the bore during the connecting process such that the convex portions are formed opposite the at least one indentation, and wherein the transverse tube has a constant thickness between a connecting part front face opposite the connecting part-rear face and a point on said transverse tube spaced apart from the connecting part bearing surface part front face and the end region of the transverse tube.

13. The adjustment device of claim 12, wherein said at least one indentation comprises four indentations, said indentations being arranged offset to one another by 90° in the region of the bore.

14. The adjustment device of claim 12, wherein each convex portion on the transverse tube is configured to be formed by at least partial deformation of a surface of the transverse tube in the region adjacent to each convex portion.

15. The adjustment device of claim 12, wherein the chamfered connecting part-bearing surface on the connecting part is chamfered by an angle between 50° and 70°.

16. The adjustment device of claim 12, wherein the chamfered connecting part-bearing surface on the connecting part is chamfered by an angle of about 60°.

17. The adjustment device of claim 12, wherein the shaped end region is configured to bear against a connecting part-rear face of the connecting part.

18. The adjustment device of claim 12, wherein the adjustment device includes a height adjustment device.

19. The adjustment device of claim 12, wherein the adjustment device includes a tilt adjustment device.

* * * * *